United States Patent [19]

Schofield, Jr.

[11] Patent Number: 5,733,069
[45] Date of Patent: Mar. 31, 1998

[54] LOOSE ROOF PLATE RETENSIONING DEVICE

[76] Inventor: John P. Schofield, Jr., R.R. 1 Box 189, Broughton, Ill. 62817

[21] Appl. No.: 754,671

[22] Filed: Nov. 21, 1996

[51] Int. Cl.$^6$ .............. E21D 21/02; F16B 35/02
[52] U.S. Cl. .............. 405/259.1; 405/259.6; 411/385
[58] Field of Search ............ 405/259.6, 259.3, 405/259.1; 411/385, 383

[56] References Cited

U.S. PATENT DOCUMENTS

| | | | |
|---|---|---|---|
| 1,201,115 | 10/1916 | Van Horne et al. | 411/385 X |
| 1,637,771 | 8/1927 | Haug | 411/385 X |
| 2,725,843 | 12/1955 | Koski . | |
| 3,304,829 | 2/1967 | Raynovich, Jr. . | |
| 4,784,530 | 11/1988 | Price | 405/259.3 |
| 4,975,014 | 12/1990 | Rufin et al. | 411/385 |
| 5,259,703 | 11/1993 | Gillespie . | |
| 5,511,909 | 4/1996 | Calandra, Jr. et al. . | |

FOREIGN PATENT DOCUMENTS

| | | | |
|---|---|---|---|
| 0074466 | 1/1949 | Norway | 411/385 |
| 1141233 | 2/1985 | U.S.S.R. | 411/385 |

*Primary Examiner*—Dennis L. Taylor
*Attorney, Agent, or Firm*—Polster, Lieder, Woodruff & Lucchesi

[57] ABSTRACT

The present invention relates to a loose roof plate retensioning device for the roof of a mine. The device is comprised of an externally threaded split bushing, a spacer unit and an internally threaded nut, the threading being complementary to that of the threaded bushing. When a roof plate becomes loose and drops down on the head of the roof bolt to leave a space between the roof and the roof plate, the device of the present invention allows the roof plate to be snugged against the mine roof.

4 Claims, 3 Drawing Sheets

5,733,069

1

LOOSE ROOF PLATE RETENSIONING DEVICE

BACKGROUND OF THE INVENTION

The present invention relates to a device for retensioning a loose roof plate to restore the roof plate to a snug position in a mine.

In the art of mine tunnel roof support, mine roof bolts are anchored in bore holes drilled in the mine roof. The purpose of the bolt and accompanying plate are to reinforce and stabilize the unsupported rock formation above the mine tunnel. Generally there are two categories of mine roof bolting systems. These are the tension-type systems and the passive-type systems. In each system, it is common practice to first drill a hole through the mine tunnel ceiling into the rock formation above to a depth appropriate for the type of roof material to be supported. A roof plate is mounted on the projecting head of a roof bolt before the roof bolt is installed in the hole. When installing the roof bolt in the hole, the roof plate is brought up snugly against the mine ceiling as the roof bolt is tightened in place.

In a common tension-type mine roof bolt system, an expansion shell-type anchor is installed on the threaded end of the bolt. The bolt and expansion shell anchor are inserted up into the bore hole until the roof plate is against the mine roof. The bolt is then rotated to thread a tapered plug section of the expansion shell down toward the bolt head in order to expand the jaws of the expansion shell against the interior wall of the bore hole to thereby hold the mine roof bolt in place within the bore hole, the mine roof bolt and plate functioning to support and stabilize the rock formation above the mine tunnel.

In a passive-type mine roof bolt system, the bolt is not attached to an expansion shell or similar anchor at the free end of the bolt, but rather is retained in place within the rock formation by a rapid curing resin adhesive that is mixed in the bore hole as the bolt is rotated and positioned within the bore hole. In theory, the resin adhesive bonds the bolt to the rock formation along the total length of the bolt within the bore hole in the rock formation. It is also common practice to use resin adhesive with a tension-type mine roof bolt to retain the bolt within the mine roof bore hole at least along the upper portion of the bolt.

Typically in these systems, one or more resin cartridges are inserted into the bore hole prior to insertion of the mine roof bolt. The forcing of the mine roof bolt into the bore hole while simultaneously rotating the bolt ruptures the resin cartridges and mixes the resin components within the annulus between the bolt shank and bore hole wall. Ideally, the resin adhesive mixture totally fills the annulus between the bolt shank and bore hole wall at least along the upper portion of the bolting systems and sometimes along the total length of the bolt shank and bore hole wall in passive-type systems. The resin mixture is forced into cracks and crevices in the bore hole wall and into the surrounding rock formation to adhere the bolt to the rock formation.

Over time and during mining operations, the rock formation or other strata above the mine ceiling may tend to compact and/or slough, thus allowing the roof plate to loosen thereby endangering the integrity of the mine ceiling. It has been a common practice when a roof plate becomes loose and hangs down on the head of the roof bolt, to cut a timber to the length of the distance between the mine ceiling and the floor and is wedging it between the floor and the ceiling near the loose roof plate, the timber taking the place of the roof plate. Loose plates are left dangling or are cut out by cutting the bolt head. These timbers tend to be in the way of movement of the miners and equipment through the mine tunnel. Inasmuch as the roof bolt is in a fixed position, due

2 to the adhesive resin having set the roof bolt in a fixed position, the roof bolts cannot be reset further into the rock or earth formation above the mine ceiling.

For the safety of the workers in the mine, it is imperative that when a roof plate becomes loose, the roof plate be tightened against the ceiling so as to continually maintain the integrity of the mine roof ceiling or else it is necessary to use a timber.

BRIEF SUMMARY OF THE INVENTION

The present invention provides a loose roof plate retensioning device for a loose roof plate originally held in place by a roof bolt, the roof bolt having a head and a shaft. The retensioning device is comprised of a threaded bushing, a spacer unit and an internally threaded nut. The threaded bushing is externally threaded and split lengthwise. The threaded bushing has an interior diameter at least equal to or greater than that of the diameter of the roof bolt shaft. The spacer unit has an interior diameter at least slightly larger than the largest exterior dimension of the roof bolt head and bushing. Furthermore, the spacer unit has an exterior diameter smaller than the largest exterior diameter dimension of the nut. The nut, generally a hex nut, is internally threaded to complement the threading on the exterior of the threaded bushing. In addition, the largest exterior diameter dimension of the nut exceeds the interior diameter of the spacer unit and for convenience of use, generally exceeds the exterior diameter of the spacer unit.

In order to assemble the loose roof plate retensioning device of the present invention, the two halves of the split threaded bushing are placed around the shaft of the roof bolt between the head of the roof bolt and the roof plate. Next, the spacer unit is placed over the threaded bushing and is used to push the loose roof plate up against the ceiling of the mine roof. The hex nut is then threaded onto the bottom portion of the threaded bushing and is tightened against the spacer unit until the roof plate is secured snugly against the ceiling of the mine roof.

The spacer unit needs to be shorter than the distance between the mine roof plate up against the ceiling and the roof bolt head. Similarly, the threaded bushing needs to have enough threads to match those of the nut so as to provide the best strength. The threaded bushing rests on the roof bolt head while the spacer unit rests on the hex nut and when the hex nut is tightened, the spacer unit secures the loose roof plate snugly against the roof of the mine. The lengths of the threaded bushing and spacer unit are determined by how loose the roof plate is and the resulting distance between the ceiling and the head of the roof bolt.

The present invention also relates to a method for retensioning a loose roof plate being held by a roof bolt, having a shaft and a head, to restore the roof plate to a snug position against a mine roof. The method comprises placing an externally threaded split bushing around the roof bolt shaft, the threaded bushing resting on the roof bolt head. Next, a spacer unit slides over the roof bolt head and the threaded bushing and against the loose roof plate. Next, a nut slides over the head of the roof bolt and while threading and tightening the nut around the threaded bushing, the spacer unit is forced upward against the roof plate to secure the roof plate snugly against the roof.

BRIEF DESCRIPTION OF THE SEVERAL VIEWS OF THE DRAWINGS

Corresponding reference numerals will be used throughout the several figures of the drawings.

DETAILED DESCRIPTION OF THE INVENTION

Figure 1:
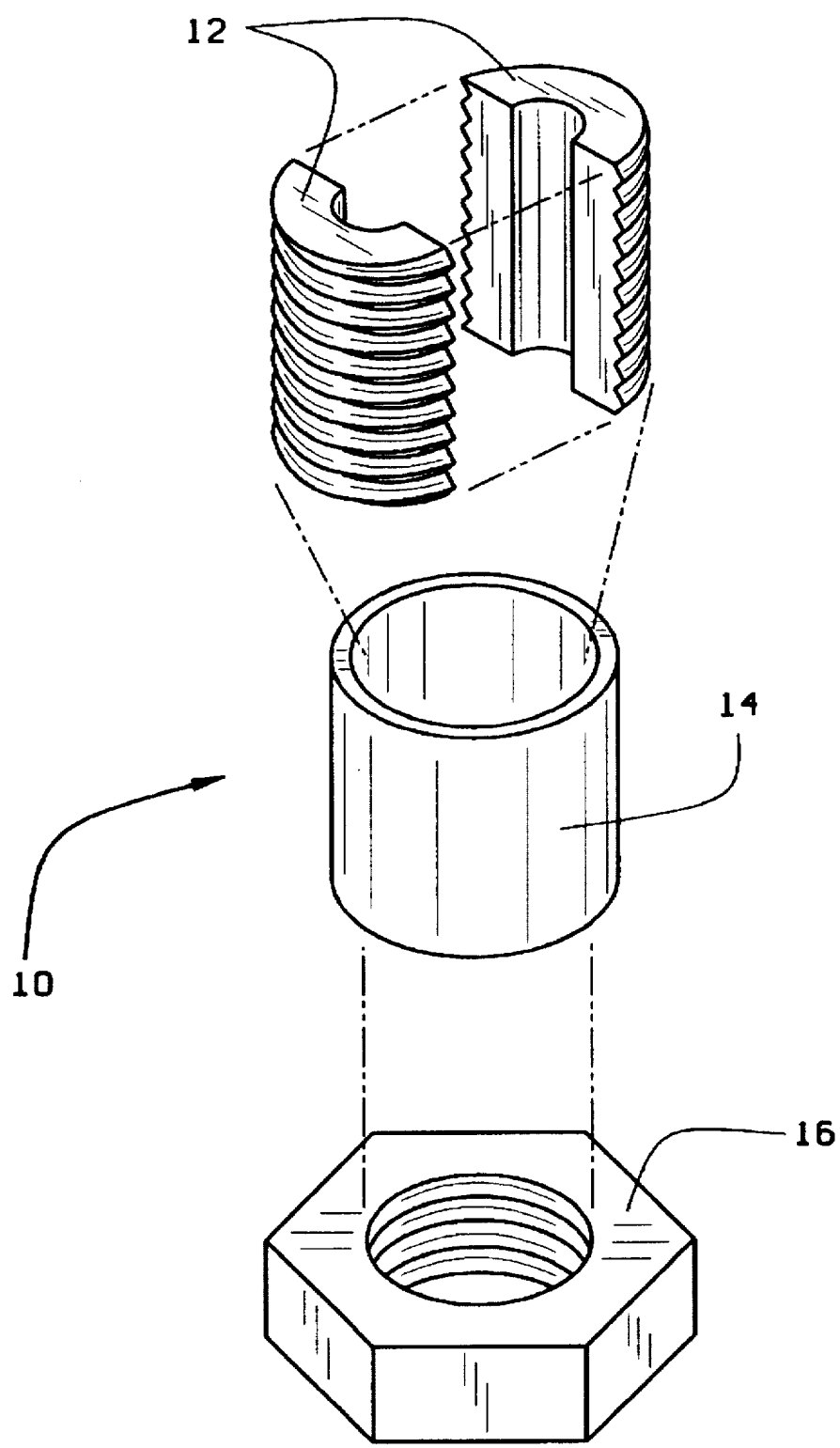
FIG. 1 is an exploded perspective view of one embodiment of the present invention.

FIG. 1 depicts a loose roof plate retensioning device 10 in an exploded perspective view wherein an externally threaded split bushing 12, a spacer unit 14 and an internally threaded nut 16 are shown in an exploded relationship such that the threaded bushing 12 will lie within the spacer unit 14 and the threaded nut 16 will be at least partially threaded onto the external threads of the threaded bushing 12.

Figure 2:
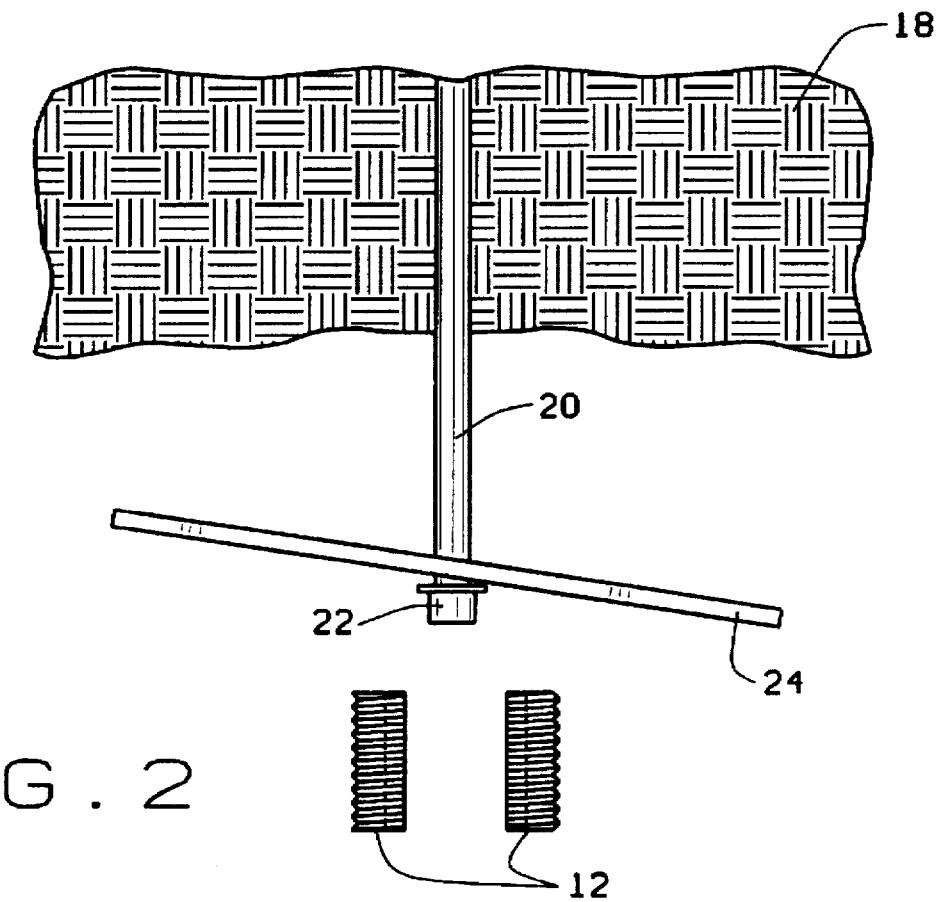
FIG. 2 is a front elevational view illustrating a loose roof plate.

FIG. 2 depicts a loose roof plate 24 suspended on a roof bolt head 22 with the roof bolt shaft 20 penetrating the roof plate 24 and the roof bolt shaft 20 being embedded in the mine roof 18. The threaded split bushing 12 is ready to be placed about the roof bolt shaft 20.

Figure 3:
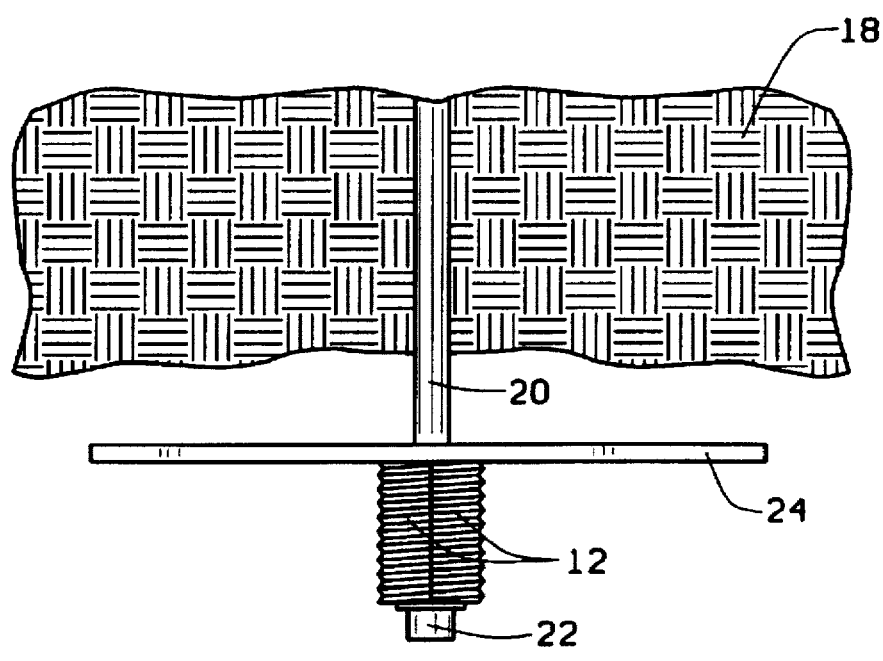
FIG. 3 is a front elevational view illustrating one segment of the present invention.

FIG. 3 depicts the threaded bushing 12 surrounding the roof bolt shaft 20 with the roof plate 24 on top of the threaded bushing 12 with the threaded bushing 12 resting on the roof bolt head 22. The spacer unit 14 is placed immediately below the position of the threaded bushing 12 so as to easily be placed around the threaded bushing 12.

Figure 4:
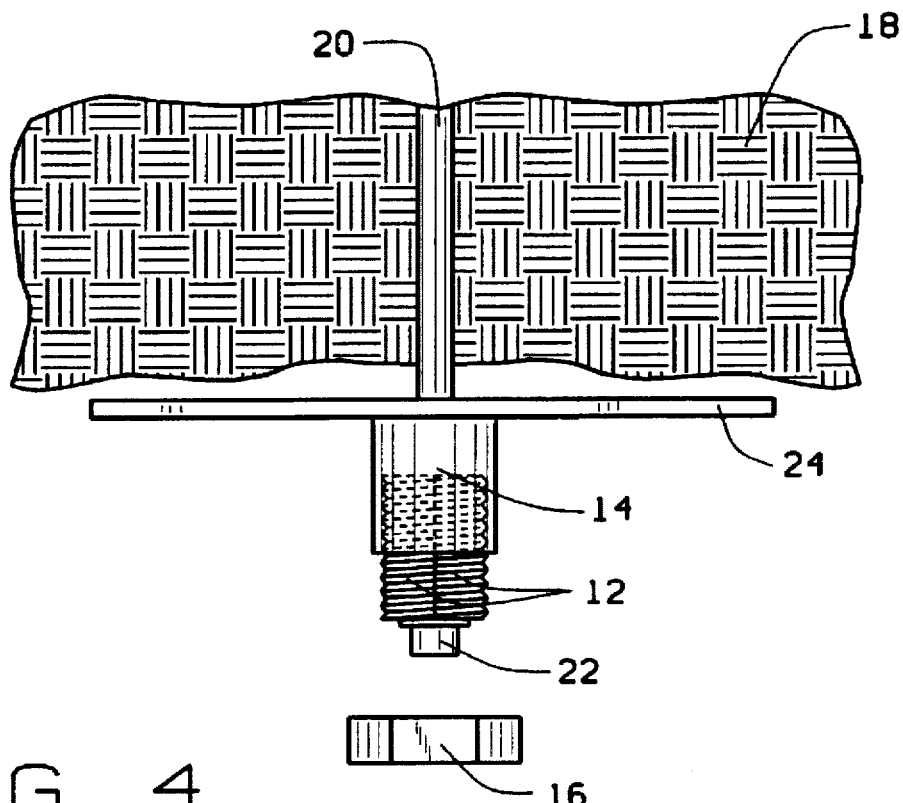
FIG. 4 is a front elevational view depicting various segments of the present invention.

FIG. 4 illustrates the placement of the spacer unit 14 against the roof plate 24 and surrounding a portion of the threaded bushing 12. The internally threaded nut 16 is positioned where it can easily be placed over the roof bolt 22 and onto the threads of the threaded bushing 12.

Figure 5:
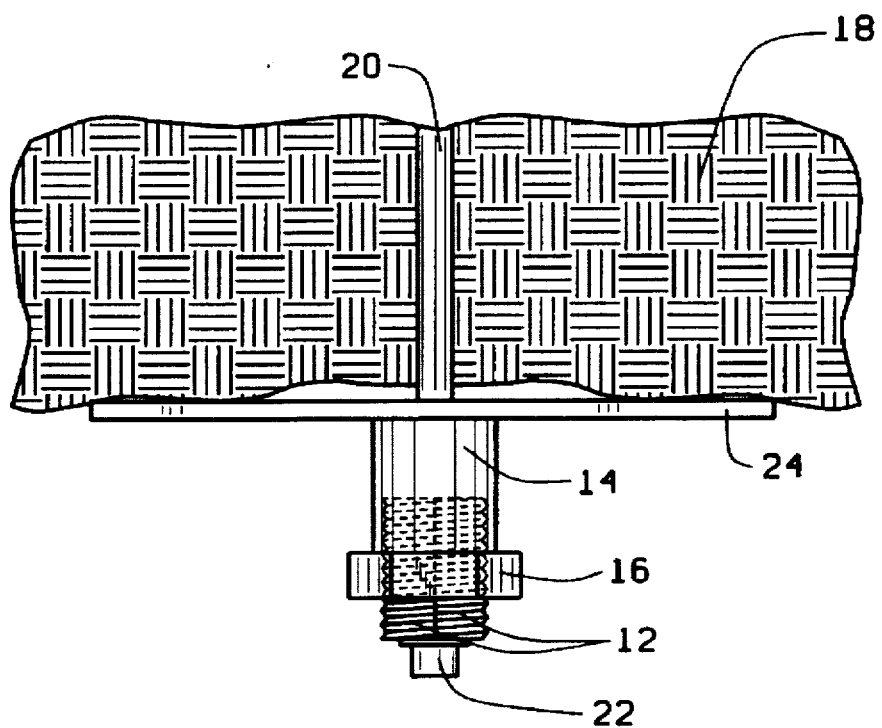
FIG. 5 is a front elevational view depicting assembled segments of the present invention.

FIG. 5 depicts the nut 16 screwed onto the threaded bushing 12 so as to push the spacer unit 14 against the roof plate 24 so that the roof plate 24 is held tightly against the mine roof 18.

When tested, the loose roof plate retensioning device 10 withstands at least 60,000 psi of pulling pressure after which the entire roof bolt dislodges from the mine roof, clearly illustrating that the loose roof plate retensioning device does not yield even at such high pressures.

The retensioning device may be made of any suitable material such as heavy cast metal, strong plastics, other metal alloys and the like.

The following detailed description illustrates the invention by way of example and not by way of limitation. This description will clearly enable one skilled in the art to make and use the invention, and describes several embodiments, adaptations, variations, alternatives and uses of the invention, including what is presently believed to be the best mode of carrying out the invention.

EXAMPLE 1

A roof plate which is dislodged from the mine roof and is suspended on the roof bolt head leaves a distance between the roof plate and the mine roof of about 5 inches. An externally threaded split bushing is formed from two inch pipe having a one inch internal diameter by threading the exterior of the pipe with 1/8 inch threads spaced at 3/16 inch intervals. The threaded pipe is about three inches in length. The pipe is then split lengthwise to form two mirror image halves. The externally threaded bushing is placed about the shaft of the roof bolt, the shaft having a diameter of less than one inch (approximately 3/4 inch), with the bottom portion of the threaded bushing resting on the roof bolt head which head has an overall exterior diameter of approximately 1.5 inches. The threaded bushing is placed around the roof bolt shaft between the roof bolt head and the loose roof plate. Next, a spacer unit about three inches long and having an internal diameter slightly greater than that of the bushing e.g., about two inches, is placed over the roof bolt head and threaded bushing, and pushed against the loose roof plate until the spacer unit is above the bottom of the bushing. A hex nut having an external measurement of about three inches with internal threads complementing those of the exterior threads of the split threaded bushing, is placed over the roof bolt head and threaded onto the threaded bushing. The hex nut is tightened until the spacer unit has pushed the loose roof plate tightly against the mine roof.

If the roof plate becomes loose again, the hex nut may be further tightened or if necessary, a longer spacer unit can be put into place and the loose roof plate retensioning device reassembled to again tighten the loose roof plate. The spacer unit may be of any convenient length so as to function in the prescribed manner to tighten the loose roof plate snugly against the mine roof.

In view of the above, it will be seen that the several objects and advantages of the present invention have been achieved and other advantageous results have been obtained.

As various changes could be made in the above constructions without departing from the scope of the invention, it is intended that all matter contained in the above description or shown in the accompanying drawings shall be interpreted as illustrative and not in a limiting sense.

I claim:

1. A loose roof plate retensioning device for a loose roof plate originally held in place by a fixed roof bolt, the roof bolt having a head and a shaft, the retensioning device comprising:

(a) an externally threaded split bushing;

(b) a spacer unit; and (c) an internally threaded nut;

wherein the threaded bushing has an interior diameter at least that of the diameter of the roof bolt shaft and an exterior diameter less than the interior diameter of the spacer unit; the spacer unit has an interior diameter at least slightly larger than the largest exterior dimension of the roof bolt head and threaded bushing; the threaded bushing rests on the head of the roof bolt; and the nut is internally threaded to complement the threading on the exterior of the threaded bushing and the largest exterior diameter dimension of the nut exceeds the exterior diameter of the spacer unit.

2. The device of claim 1 wherein the retensioning device is comprised of metal.

3. The device of claim 1 wherein the retensioning device is comprised of plastic.

4. A method for retensioning a loose roof plate, being held by a fixed roof bolt having a shaft and a head, to restore the roof plate to a snug position against a mine roof which comprises;

(a) placing an externally threaded split bushing around the roof bolt shaft in contact with the roof bolt head and between the roof bolt head and the roof plate;

(b) sliding a spacer unit over the roof bolt head and threaded bushing against the roof plate;

(c) sliding a nut over the head of the roof bolt while threading the nut onto the threaded bushing; and (d) tightening the nut around the threaded bushing and against the spacer unit until the roof plate is snug against the roof.

* * * * *